May 19, 1953 M. D. BUIVID 2,638,994
ROTOR HEAD
Filed March 30, 1951 2 Sheets-Sheet 1
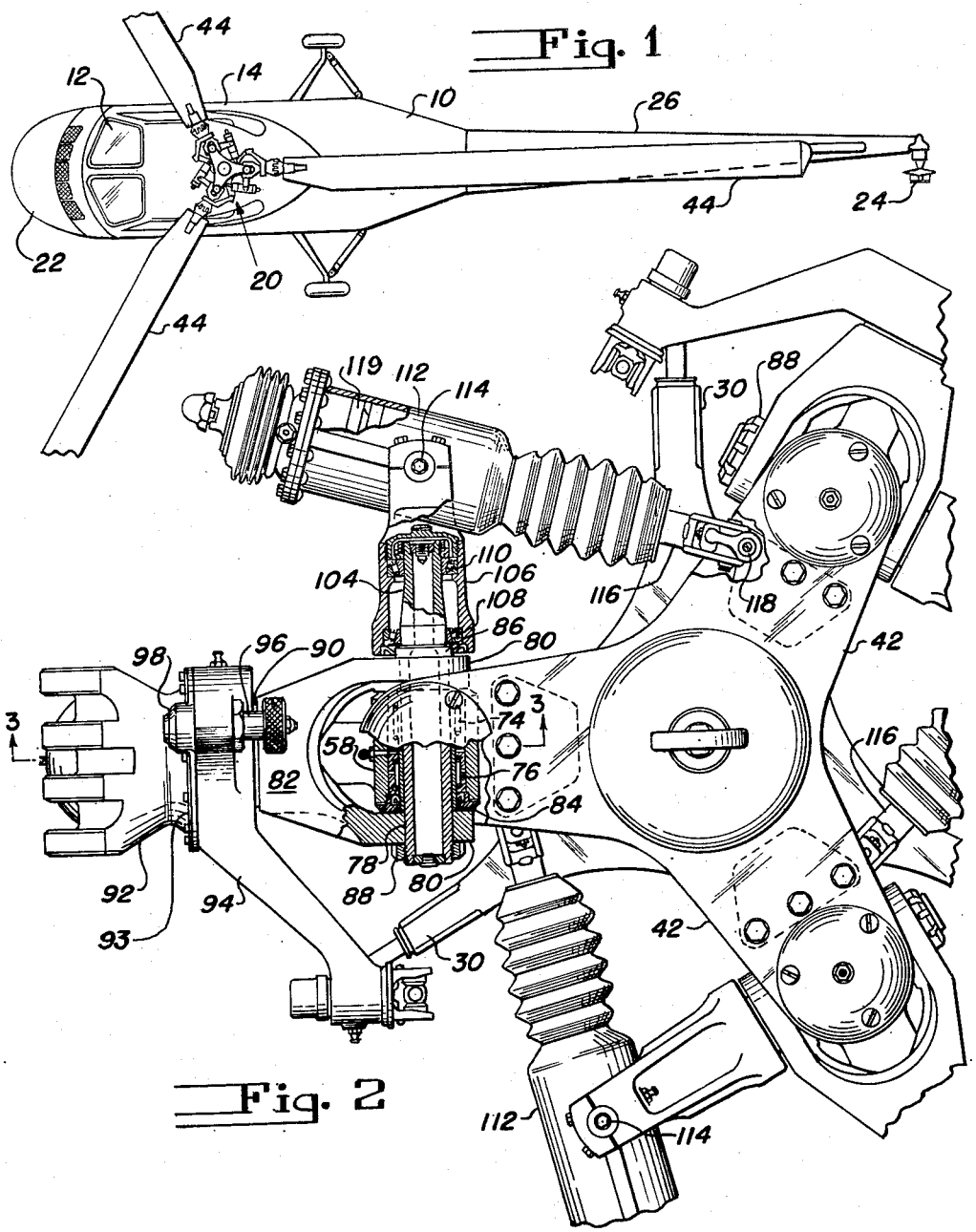
INVENTOR
MICHEL D. BUIVID
BY M. B. Tasker
ATTORNEY May 19, 1953  M. D. BUIVID  2,638,994
ROTOR HEAD Filed March 30, 1951  2 Sheets-Sheet 2

INVENTOR
MICHEL D. BUIVID
BY M. B. Tasker
ATTORNEY

Patented May 19, 1953

2,638,994

UNITED STATES PATENT OFFICE 2,638,994

ROTOR HEAD

Michel D. Buivid, Milford, Conn., assignor to United Aircraft Corporation, East Hartford, Conn., a corporation of Delaware Application March 30, 1951, Serial No. 218,313

4 Claims. (Cl. 170—160.55)

1

This invention relates to rotary wing aircraft and particularly to improvements in the rotor head construction of such aircraft in which the rotor blades are individually pivoted for flapping movement about generally horizontal flapping hinges.

One of the difficulties encountered in aircraft of this type has been a tendency to excessive wear in the flapping hinges of the separately articulated blades due to the fact that centrifugal force acting on the rotating blades causes the inboard sides of the flapping hinge bearings to carry all of the bearing load while centrifugal force acting on the lubricant in the bearings moves the lubricant to the outboard sides of the bearings.

It is an object of this invention to provide an improved flapping hinge construction for the blades of rotary wing aircraft in which the bearing loads due to centrifugal force acting on the blades act on the outboard sides of the flapping hinge bearings where there is always adequate lubricant.

Another object of the invention is to provide an improved construction of flapping hinge for supporting the drag hinge dampers of a rotary wing aircraft.

A further object of this invention is generally to improve the construction and prolong the working life of rotor heads for rotary wing aircraft.

These and other objects and advantages of the invention will become apparent or will be particularly pointed out in the following description of a preferred embodiment of the invention shown in the accompanying drawings:

In these drawings:

Fig. 1 is a top plan view of a three-bladed helicopter embodying the invention;

Fig. 2 is an enlarged view of a part of the rotor head of Fig. 1 showing the structure for attaching one of the blades, parts being shown in section in the vicinity of the flapping hinge;

Figures 3, 4:
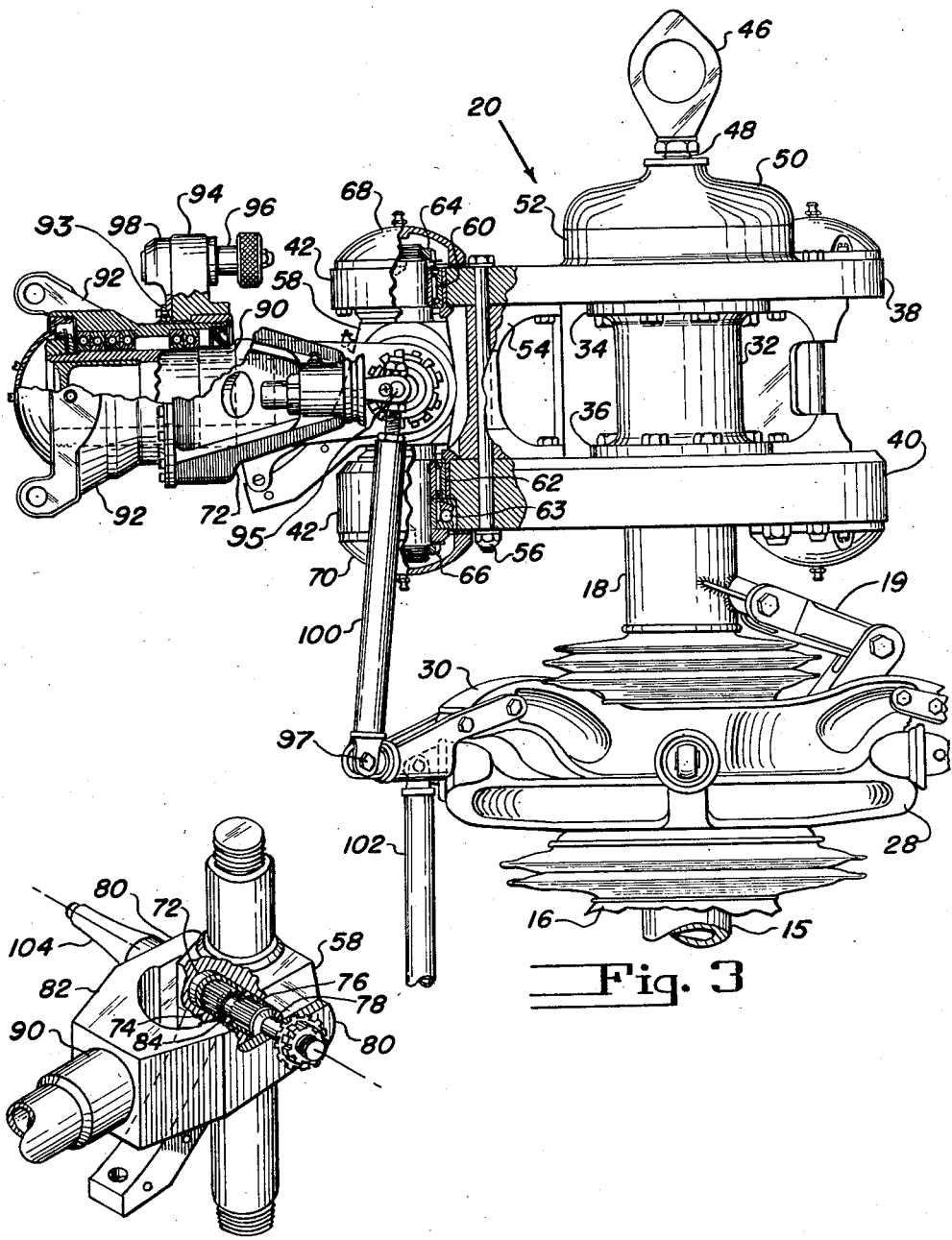
Fig. 3 is a side elevation of Fig. 2 with parts shown in section to facilitate illustration and, Fig. 4 is a perspective detail of the drag hinge showing the flapping hinge bearings.

As herein shown, the helicopter embodying the present invention includes an elongated fuselage 10 which contains a forward pilot compartment 12 and a centrally disposed cargo or passenger compartment 14 above which a pylon 16 supports a generally upright main drive shaft 15 which drives the rotor head generally indicated at 20. The engine for driving the rotor is contained in a nose compartment 22 and the torque of the

2 single main motor is compensated for by a tail rotor 24 located at the extremity of a tail cone 26 extending aft of the fuselage.

The main drive shaft 15 carries a splined hub 32 having flanges 34 and 36 which are bolted to corresponding spaced plates 38 and 40 as shown in Fig. 3.

Plate 40 has a tubular depending extension 18 to which the scissors 19 which drives the rotating swashplate 30 is pivotally connected.

Spaced plates 38 and 40 which, as shown in Fig. 3 have three radially extending arms 32 as shown in Fig. 2. These arms are spaced 120° apart and provide the support for the three articulated rotor blades 44. The upper extremity of the drive shaft 15 is provided with a hoisting eye 46 which is secured thereto by a threaded stud 48 in any suitable manner. Surrounding the stud 48 is a hollow cap 50 which cooperates with an upstanding flange 52 on plate 38. The arms 42 are supported intermediate their length by spacers 54 which are held in position by bolts 56 extended through the spacers and the upper and lower plates 38 and 40. Each arm 42 of the upper and lower plates 38 and 40 supports an articulated rotor blade 44. Since the three blades and the mountings therefor are identical, only one has been shown in detail and only one will be described herein. At the extremities the arms 42 have vertically aligned apertures in which a drag hinge 58 is journalled on needle bearings 60 and 62 in plates 38 and 40 respectively. A ball thrust bearing 63 is also provided in the somewhat heavier lower plate 40, the whole bearing assembly being positioned by upper and lower nuts 64 and 66 which are screw threaded onto the upper and lower axial ends of the drag hinge. Suitable closure caps 68 and 70 are provided above and below plates 38 and 40 to enclose the hinge bearings and to confine the usual lubricant provided for the bearings.

As shown most clearly in Fig. 4, the vertical hinge, or drag hinge, has a transverse passage 72 the axis of which intersects its own vertical axis. This passage has two roller bearings 74 and 76 therein on which is journalled a flapping hinge 78 which is fixed in the forked ends 80 of a flapping link 82. As shown most clearly in Fig. 2, the horizontal flapping pin 78 is provided with a replaceable bearing sleeve 84 which is held in position in the passage 72 by engagement with the confronting inner faces of the forked ends 80 of the flapping link. The pin 78 is clamped rigidly into the forked ends of the flapping link between a shoulder 86 and a clamping nut 88 on the pin so that rotation of the pin in the forked arms 80 is made impossible and all rotation of the flapping link relative to the drag hinge 58 takes place between the bearing sleeve 84 and the needle bearings 74 and 76 in the passage 72 of the drag hinge.

The blade 44 is attached to the flapping link 82 by means which provide for folding of the blade. To this end the flapping link has a radially extending feathering spindle 90 on which the blade attaching sleeve 92 is journalled for rotation to vary the pitch of the blade. Inboard of the blade attaching sleeve 92 a blade pitch changing horn 94 is also journalled on the spindle 90 and is normally connected with sleeve 92 by a slidable looking pin 96. It will be evident that when the pin 96 is retracted from the boss 98 attached by flange 93 to sleeve 92, the latter can then be rotated freely on the spindle 90 during the blade folding operation. However, when the pin 96 is engaged in the boss 98 movement of the blade pitch changing horn 94 will adjust the pitch of the blade about the axis of the spindle. Control of the blade pitch is obtained in a usual manner through a push-pull rod 100 which connects via universal 95 to the horn 94 and with the rotatable swashplate member 30 via universal 97. Tilting of the stationary swashplate member 28 is accomplished by means of usual push-pull rods, one of which is shown on 102, to impart cyclic pitch control to the blades of the rotor head.

Referring to Fig. 2, it will be noted that the horizontal hinge pin 78 which is rigidly connected to the flapping link has a laterally extending portion 104 on which a damper mounting sleeve 106 is journalled on taper bearings 108 and 110. Damper 112, which may be the usual hydraulic cylinder and piston type damper shown in my Patent No. 2,554,774, issued May 29, 1951, is pivotally supported at 114 on the end of sleeve 106, the damper being thus bodily movable with the flapping link as the latter moves about the drag hinge 58 in the plane of rotation of the blade. Furthermore this allows the blade to move in the flapping plane without affecting the damper. The inboard end of the piston rod 116 is connected by a suitable pivot joint 118 to the hub structure between the upper and lower plates 38 and 40 as shown most clearly in Fig. 2 and carries the usual piston 119 at its free end.

As a result of the above described construction for hinging the flapping link in which the generally horizontal hinge pin for the flapping link is rigidly secured in this link and is journalled in hub-carried bearings, it will be evident that centrifugal forces acting on the blades will cause the bearing pressures due to these centrifugal loads to be exerted against the outboard side of the hub-carried bearings 76 where the lubricant for the bearings is naturally moved by the same centrifugal forces.

It will also be evident that a particularly simple and effective means has been provided for mounting the drag hinge dampers on the ends of the flapping hinge by which flapping movements of the blades does not affect the dampers.

While the invention has been shown in connection with a preferred form thereof, it will be evident that various changes in the construction and arrangement of the parts may be resorted to without departing from the scope of the invention.

I claim:

1. In a rotary wing aircraft, a hub structure, a generally horizontal flapping hinge pin journalled in said hub structure, a flapping link secured rigidly to said pin and movable bodily therewith in said hub journal, said pin having an extension on one side of said flapping link, a sleeve journalled on said extension, a damper including cooperation piston and cylinder elements, a pivotal connection between said sleeve and one of said damper elements, and a pivotal connection between the other damper element and said hub structure.

2. In a rotary wing aircraft, a drive shaft, hub structure on said shaft including spaced upper and lower plate elements, a drag hinge journalled in said plate elements for movement about a generally vertical axis, a flapping hinge pin journalled in said drag hinge for movement about a generally horizontal axis, said pin extending laterally beyond said drag hinge on both sides of said journal, a flapping link having a yoke straddling said drag hinge and secured to said flapping pin on opposite sides of said drag hinge, a sleeve journalled on one of the extensions of said flapping pin, a damper including cooperating piston and cylinder elements, a pivotal connection between one of said damper elements and said sleeve, and a pivotal connection between hub structure and the other of said damper elements.

3. In a rotary wing aircraft, a hub structure, a rotor blade pivotally connected to said hub structure by flapping and drag hinges, said flapping hinge having a lateral extension, a sleeve journalled on said extension, a damper for controlling movements of said blade about said drag hinge having cooperating cylinder and piston elements, a pivotal connection between one of said damper elements and said sleeve, and a pivotal connection between the other damper element and said hub structure.

4. In a rotary wing aircraft, a hub structure, a drag hinge journalled in said hub structure for movement about a generally vertical axis, a flapping hinge pin journalled in said drag hinge for movement about a generally horizontal axis, said pin having its ends projecting laterally beyond said drag hinge on both sides of said journal, a flapping link having a yoke on its inboard end straddling said drag hinge and secured to the extension of said flapping pin, a sleeve journalled on one of said extensions, a damper including cooperating piston and cylinder elements having a pivotal connection between one of said elements and said sleeve, and a pivotal connection between the other damper element and said hub structure.

MICHEL D. BUIVID.

References Cited in the file of this patent
UNITED STATES PATENTS

| Number | Name | Date |
|---|---|---|
| 1,948,456 | Cierva | Feb. 20, 1934 |
| 1,986,709 | Breguet et al. | Jan. 1, 1935 |
| 2,105,682 | Bennett et al. | Jan. 18, 1938 |
| 2,529,635 | Sikorsky | Nov. 14, 1950 |